(12) United States Patent
Iori et al.

(10) Patent No.: US 8,972,579 B2
(45) Date of Patent: Mar. 3, 2015

(54) RESOURCE SHARING IN COMPUTER CLUSTERS ACCORDING TO OBJECTIVES

(75) Inventors: Enrico Iori, Treviso (IT); Alkiviadis Simitsis, Santa Clara, CA (US); Themistoklis Palpanas, Trento (IT); William K Wilkinson, San Mateo, CA (US); Stavros Harizopoulos, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 296 days.

(21) Appl. No.: 13/605,651

(22) Filed: Sep. 6, 2012

(65) Prior Publication Data

US 2014/0068055 A1 Mar. 6, 2014

(51) Int. Cl.
 *G06F 15/173* (2006.01)
(52) U.S. Cl.
 USPC .......................................................... 709/226
(58) Field of Classification Search
 USPC ........................................ 709/223–226, 229
 See application file for complete search history.

(56) References Cited

U.S. PATENT DOCUMENTS

| 6,374,297 | B1 | 4/2002 | Wolf et al. | |
|---|---|---|---|---|
| 6,993,571 | B2 * | 1/2006 | Kistler | 709/218 |
| 7,555,427 | B2 | 6/2009 | Kirshenbaum | |
| 2003/0055969 | A1 * | 3/2003 | Begun et al. | 709/226 |
| 2006/0129675 | A1 * | 6/2006 | Zimmer et al. | 709/225 |
| 2007/0220586 | A1 | 9/2007 | Salazar et al. | |
| 2009/0222544 | A1 * | 9/2009 | Xiao et al. | 709/223 |
| 2011/0138055 | A1 * | 6/2011 | Daly et al. | 709/226 |
| 2011/0320606 | A1 | 12/2011 | Madduri et al. | |
| 2013/0212411 | A1 * | 8/2013 | Nicholson et al. | 713/310 |

OTHER PUBLICATIONS

Chandra, A et al, "Dynamic Resource Allocation for Shared Data Centers Using Online Measurments" ~ 2003 ~ pp. 18.
Hindman, Benjamin et al, "Flexible Resource Sharing for the Cloud" ~ Aug. 2011 ~ pp. 37-45.
Korupolu, M. et al, "Coupled Placement in Modern Data Centers" ~ 2009 ~ pp. 12.
Singh, A, et al, "Integrated Resource Allocation in Heterogeneous San Data Centers" ~ 2007 ~ pp. 328-329.
Yeo, Chee Shin, "Utility-based Resource Management for Cluster Computing" ~Jan. 2008 ~ pp. 169.

* cited by examiner

*Primary Examiner* — Brendan Higa
(74) *Attorney, Agent, or Firm* — Hewlett-Packard Patent Department

(57) ABSTRACT

A method of assigning resources of a computer duster with resource sharing according to objectives. The method includes monitoring resources of each of a plurality of cloud nodes, providing information descriptive of the cloud node resources, receiving a reservation, determining whether resources are available to satisfy the reservation and any other pending reservations, if resources are available, using a rapid search to determine resource assignments for the reservation and any other pending reservations according to one or more objectives, and allocating resources according to the resource assignments.

14 Claims, 16 Drawing Sheets

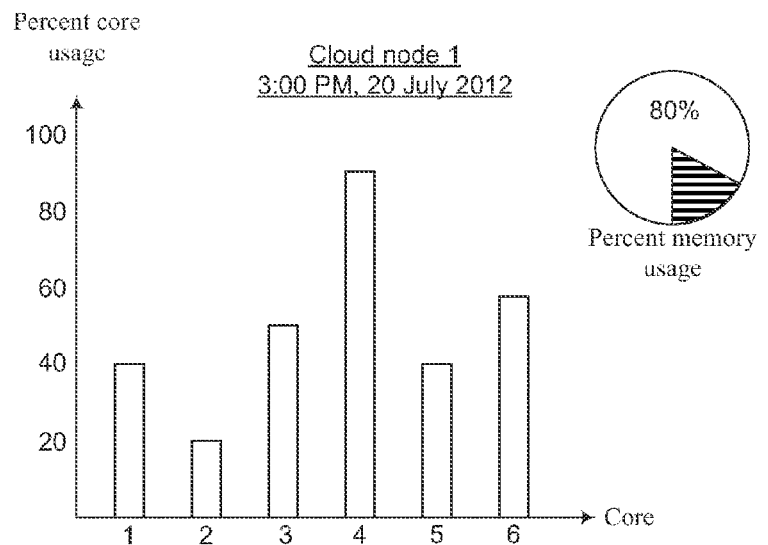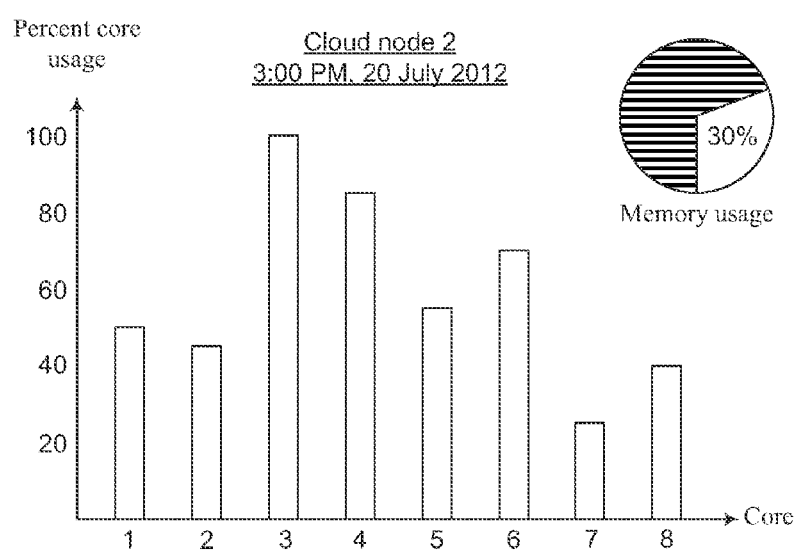
Figure 6

Manual Booking

Cluster node 2, Thursday __[date]__ 12:01 AM to Friday __[date]__ 12:00 AM

Required cores: 8
Required RAM: 10
Required I/O: 800
Notes:
Flexibility: ☑ Is flexible

2 __ to __ cores 8

Add requirement
Confirm booking

— 900

Automatic Booking

Cluster node 2, Thursday __[date]__ 12:01 AM to Friday __[date]__ 12:00 AM

From:
To:

Machines number:
Required cores:
Required RAM:
Required I/O:
Notes:
Flexibility: ☐ Is flexible Confirm booking

RESOURCE SHARING IN COMPUTER CLUSTERS ACCORDING TO OBJECTIVES

BACKGROUND

Cloud computing may be considered as the delivery of computer services to end customers. The cloud computing environment is emerging as a promising environment offering flexibility, scalability, elasticity, fan-safe mechanisms, high availability, and other valuable features. Computer services provided in this environment, which may include for example data storage, data processing, and transmission of data from place to place, are provided by processors (cores), data storage units, software, and other such elements that typically are remotely located from the customers and sometimes from each other as well. The cloud name and symbol have come to be convenient abstractions for what in reality may be highly complex systems. Customers of such systems entrust data to the "cloud" and expect the "cloud" to provide computation services by means of software, hardware, or both. A cloud computing system, which may also be referred to as a computer cluster, may include one or more physical computers (referred to as machines or as nodes) each of which has from one to many processors and associated memory, data storage, communication facilities, and other hardware and software as needed. Open source tools and service providers have made such computer clusters easy to create and use. In some cloud computing systems, one or more processors or even entire nodes may be reserved exclusively for one customer for a defined period of time; individual processors are not shared but overall cluster resources may be shared among many customers so long as the cumulative demand of all of them does not exceed the resources of the cluster. In another approach, often used in public clouds such as Amazon EC2, a plurality of virtual machines may be run across some or all of the nodes and made available to customers as requested.

BRIEF DESCRIPTION OF THE DRAWINGS

The figures are not drawn to scale. They illustrate the disclosure by examples.

FIG. 6 is a bar and pie graph illustrating an example of a node monitoring report that might be generated in a computer cluster with resource sharing according to objectives.

FIG. 9 is a visual display illustrating examples of manual and automatic reservation entry screens for resource sharing in computer clusters according to objectives.

DETAILED DESCRIPTION

Figure 1A:
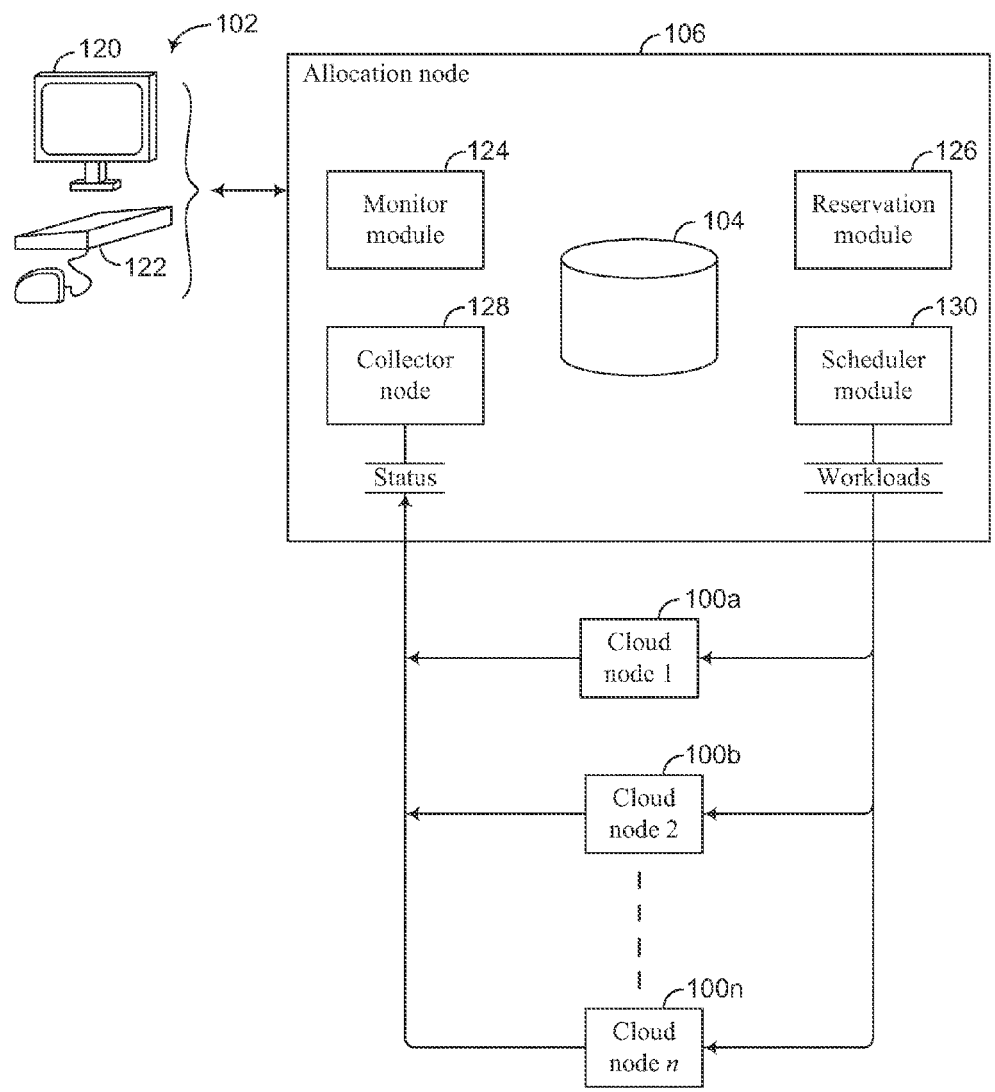
FIG. 1A is a block diagram of an example of resource sharing in computer clusters according to objectives.

Illustrative examples and details are used in the drawings and in this description, but other configurations may exist and may suggest themselves. Parameters such as voltages, temperatures; dimensions, and component values are approximate. Terms of orientation such as up, down, top, and bottom are used only for convenience to indicate spatial relationships of components with respect to each other, and except as otherwise indicated, orientation with respect to external axes is not critical. For clarity, some known methods and structures have not been described in detail. Methods defined by the claims may comprise steps in addition to those listed, and except as indicated in the claims themselves the steps may be performed in another order than that given.

The systems and methods described herein may be implemented in various forms of hardware, software, firmware, special purpose processors, or a combination thereof. At least a portion thereof may be implemented as an application comprising program instructions that are tangibly embodied on one or more program storage devices such as hard disks, magnetic floppy disks, RAM, ROM, and CDROM, and executable by any device or machine comprising suitable architecture. Some or all of the instructions may be remotely stored. Some of the constituent system components and process steps may be implemented in software, and therefore the connections between system modules or the logic flow of method steps may differ depending on the manner in which they are programmed.

Meeting the needs of many users of a computer duster in a cloud computing environment has proved to be challenging. Exclusive reservation of cloud computing resources for individual customers, as is often done in environments such as research and development, leads to underuse of scarce resources and may result in some customers getting no resources at all. On the other hand, since there is no limit (at least in theory) to how many virtual machines can run, every user can be assigned a virtual machine. But physical resources must be allocated to these virtual machines, and sharing resources by running multiple virtual machines across the cluster means that customers have little guidance or influence on the number of virtual machines per node or on a customer's assignment to nodes. Too many virtual machines running at once can degrade performance system-wide with the result that no user gets the level of service required, and consequently applications can have unpredictable performance making service guarantees difficult. Customers who in turn make computer service available to others may have trouble guaranteeing service levels. There remains a need for a way to manage computer system resources in a cloud computing environment in such a way that as many users are accommodated as possible and resources are used as efficiently as possible.

Figure 1B:
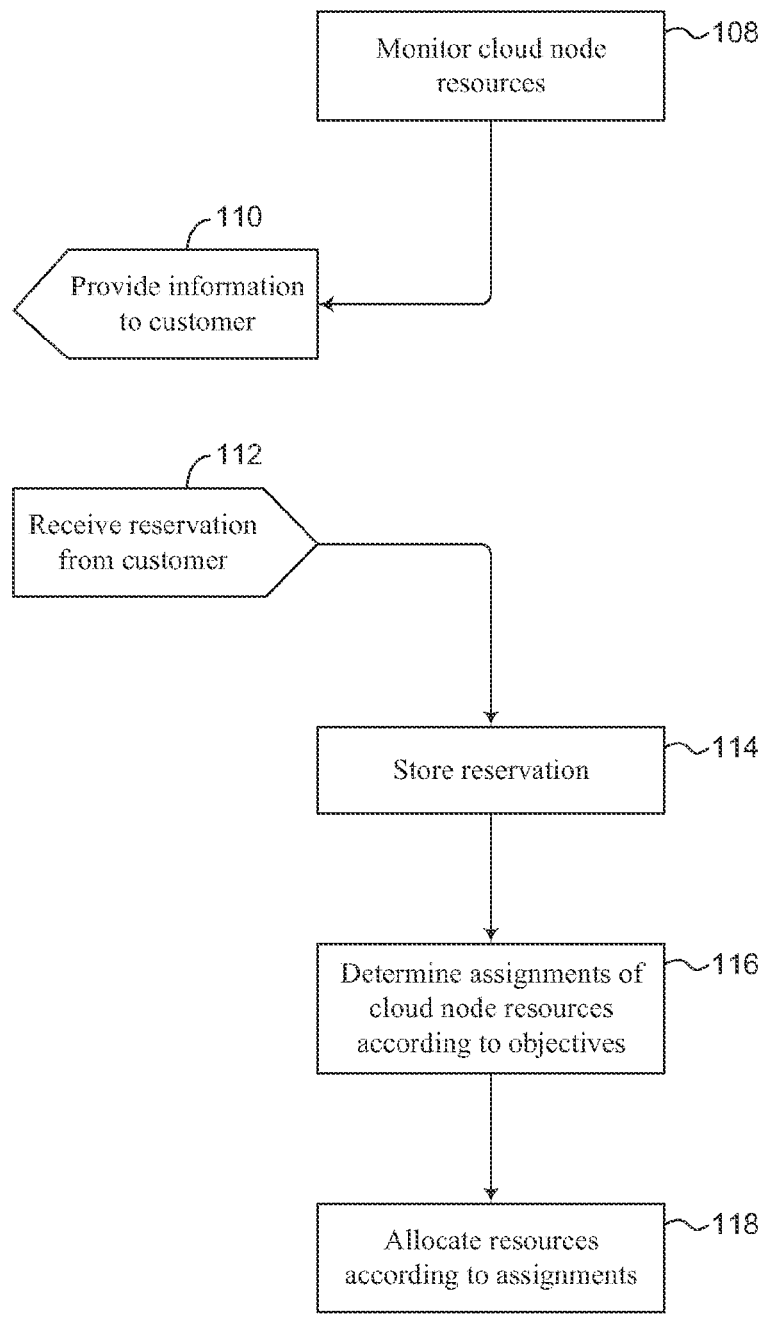
FIG. 1B is a flow chart depicting an example of an allocation node of the cluster shown in FIG. 1A.

FIGS. 1A and 1B give an example of resource sharing in a computer cluster according to objectives. The cluster includes a plurality of cloud nodes 100a, 100b, ... 100n each including one or more resources, a terminal 102, data storage 104, and an allocation node 106 to monitor (108) the cloud node resources, provide (110) information descriptive of the cloud node resources to a customer through the terminal 102, receive (112) a reservation for cloud node resources from the customer, store (114) the reservation in the data storage 104, determine (116) assignments of the cloud node resources for the reservation and any other pending reservations according to one or more objectives, and allocate (118) cloud node resources to customers according to the resource assignments.

In some examples the terminal 102 includes an output device such as a visual display 120 and an input device such as a keyboard 122. The customer may be a human user or an application running on another computer system.

Figure 2:
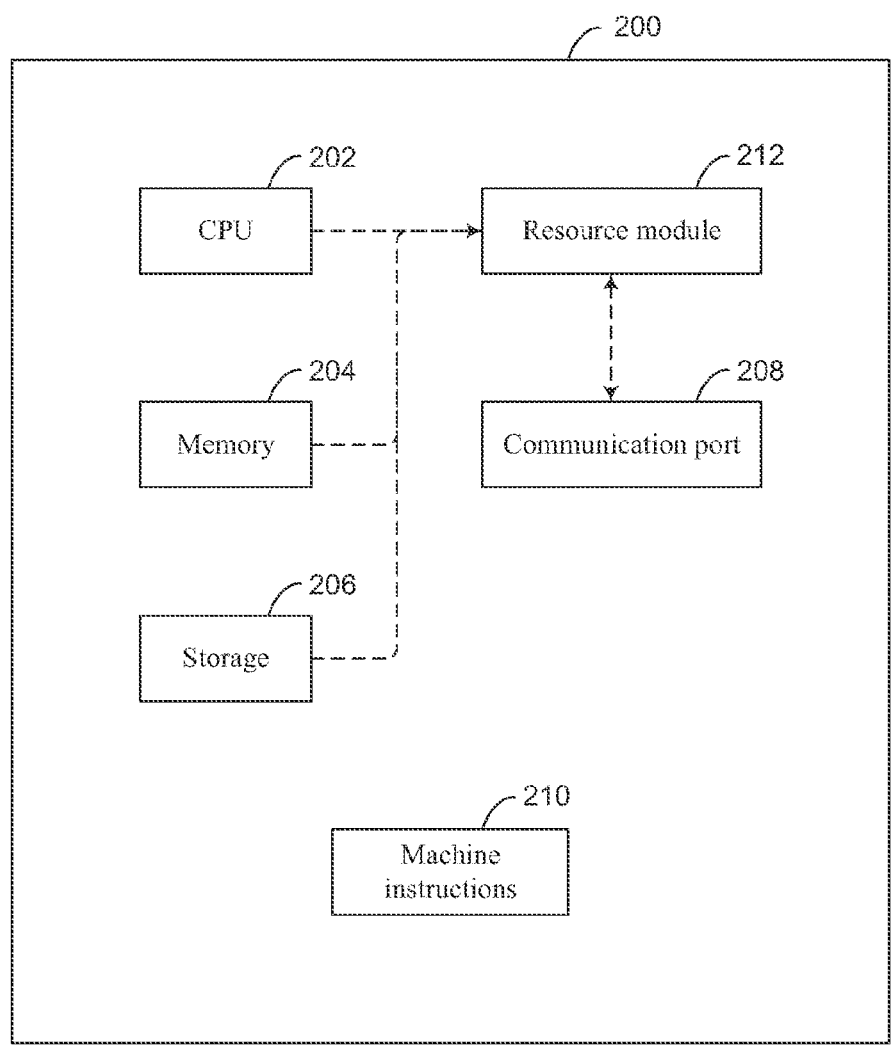
FIG. 2 is a block diagram of an example of a cloud node of the duster of FIG. 1A.

The cloud nodes 100a, 100b, ..., 100n may all be the same or they may differ from each other. An example of a cloud node 200 is shown in FIG. 2. The cloud node 200 includes a central processing unit 202, memory 204, local data storage 206, a communication port 208, and machine instructions 210. The machine instructions 210 may be located, for example, in the memory 204 or the local data storage 206, or the instructions may be remotely located. Other cloud nodes may have multiple processors or other devices in addition to or instead of the ones in the cloud node 200.

The cloud node 200 includes a resource module 212 to monitor resources of that cloud node and provide information respecting use of those resources to the allocation node. This information may include such items as processor usage, amount of memory used, storage used, storage bandwidth used, network bandwidth used, and the like. In some examples the allocation node stores that information in the data storage for accounting and analysis.

A suitable transport mechanism such as NFS (network file system) infrastructure or HTTP protocol may be used to transmit the reports. The module 212 may comprise a physical unit or its function may be performed by the CPU 202, for example under control of the machine instructions 210. In some examples the resource module 212 reports use of node resources periodically, and in other examples reports are made in response to an event such as a change in the use of the resources or a request from the allocation module 106. In some examples the monitored cloud node resources comprise one or more of memory, processor, data storage, and message traffic (communications). Some examples use Hyperic's System Information Gatherer (SIGAR), a cross-platform API for collecting software inventory data, although other tools for collecting node resource usage may be used.

In some examples the objectives that are used to determine assignments of resources comprise one or more of minimum power usage, minimum memory usage, and minimum response time. Other objectives may be used in addition to or instead of any of these, and the objectives may be adapted to changing needs over time. An objective may be changed (added, removed, or modified) by an administrator.

In some examples the allocation node 106 comprises a monitor module 124 and a reservation module 126. The functions of these modules will be described in more detail presently. The allocation node may include a collector 128 that collects data resulting from monitoring the cloud nodes 100a through 100n and passes that data to the monitor module 124.

The allocation node may include a scheduler module 130 to implement resource assignments by sending workloads to the cloud nodes. In some examples the allocation node also serves as a cloud node, but in other examples the allocation node does not perform this additional function. In this example the data storage 104 is within the allocation node, but in other examples the data storage may comprise a separate unit or may be remotely located.

As will be described in more detail presently, in some examples if the reservation includes a user-specified resource, the allocation node informs the user of availability of the resource and of an alternative if the resource is not available.

In some examples the allocation node performs a re-allocation of resources among remaining cloud nodes if a cloud node goes off-line or for any reason becomes unavailable or if a previously-inactive node becomes available. Cloud nodes may go off-line for many reasons including local electrical power failure, internal malfunction, routine maintenance, installation of new software or hardware elements, etc.

Figure 3:
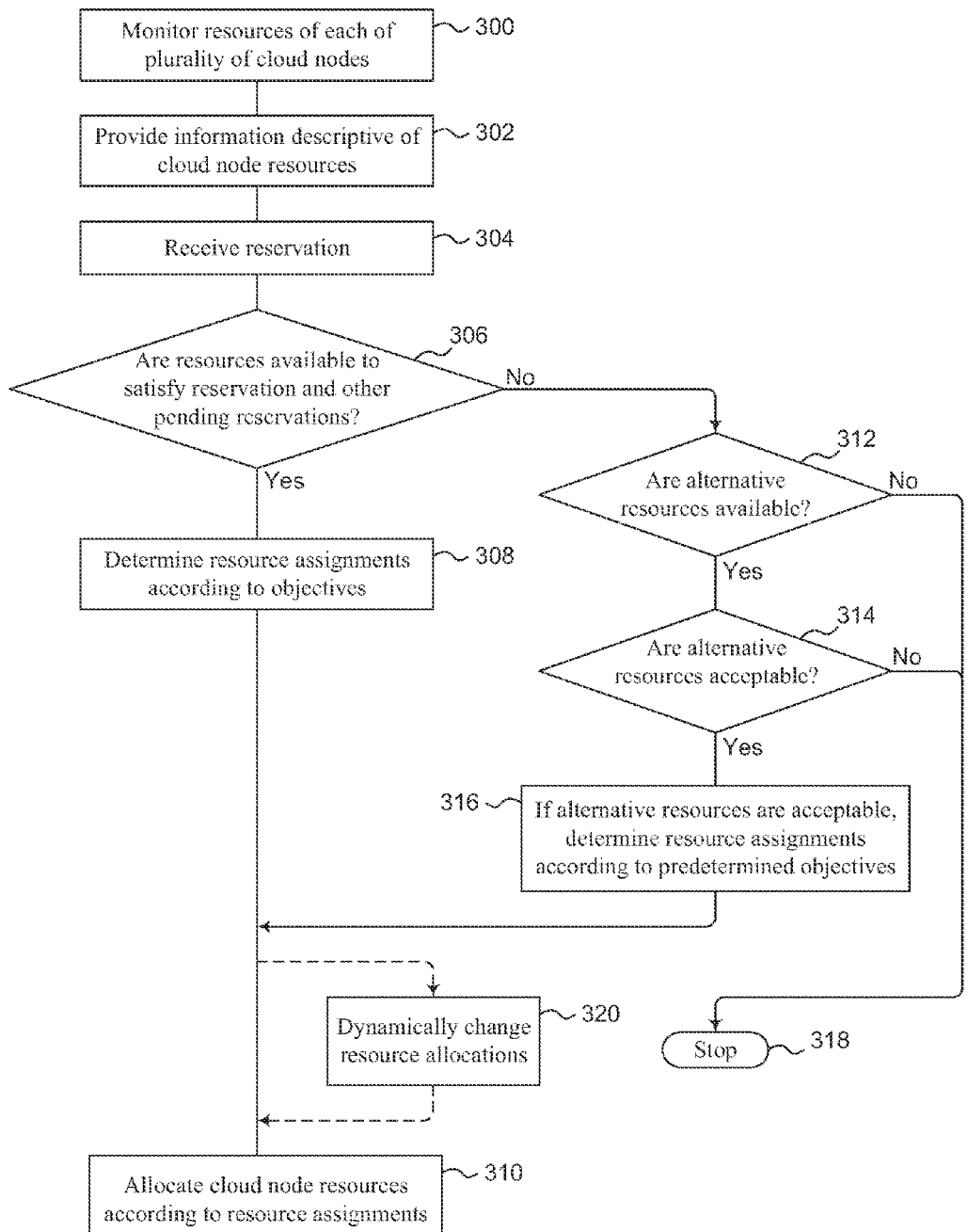
FIG. 3 is a flow chart giving an example of a method of resource sharing in computer clusters according to objectives.

FIG. 3 gives an example of a method of operating a computer cluster with resource sharing according to objectives. The method includes monitoring resources of each of a plurality of cloud nodes (300), providing information descriptive of the cloud node resources (302), receiving a reservation for cloud resources (304), determining whether resources are available to satisfy the reservation and any other pending reservations (306), if resources are available, determining resource assignments for the reservation and any other pending reservations according to one or more objectives (308), and allocating the cloud node resources according to the resource assignments (310).

Some examples include, if resources are not available to satisfy a reservation, determining whether alternative resources are available (312); if alternative resources are available, determining whether the alternative resources are acceptable (314); and if the alternative resources are acceptable, determining resource assignments according to the objectives (316). For example, suppose a customer submits a reservation for ten cores in one cloud node during a certain time frame. If these resources are not available, the customer is advised of an available alternative, such as five cores in each of two cloud nodes. If the customer accepts the alternative, the resource assignment proceeds.

In some examples, if alternative resources are not available or acceptable, no further action is taken (318). In this event, the customer may be informed that the reservation cannot be satisfied.

In some examples the reservation includes a list of cloud resources and a starting time. In other examples the reservation may be a composite reservation of more than one sub-task. For example, a composite reservation might include a first sub-task requiring ten cores for two hours at 1:00 PM, a second sub-task requiring ten more cores at 1:30 PM for one hour, and a third sub-task requiring two cores at 2:30 PM for two hours. The starting time may specify one or more of an immediate start, a start at a specified future time, or a start not later than a specified future time. In the latter case, the reservation may be designated as a "flexible" reservation because the customer can accept any of a number of possible start times up to some time that may be relatively far in the future. Flexible reservations allow the allocation node to adjust resource allocations on-the-fly depending on cloud node status, other reservations that may arrive later, and the like.

In some examples determining whether resources are available comprises determining whether any requested specific resources are available.

In some examples monitoring resources of each of a plurality of cloud nodes comprises monitoring resource use in each cloud node and periodically reporting usage of those resources. In some examples monitoring resources of each of a plurality of cloud nodes comprises one or more of monitoring amount of memory being used, amount of processor capacity being used, amount of data being stored in a local data storage, bandwidth being used in transferring data to or from storage, volume of message traffic being generated, and network bandwidth being used by message traffic.

Some examples include dynamically changing resource allocations according to at least one of resource availability, priority of reservation, and designations of any reservations as flexible (320). Dynamically changing resource allocations may include recalculating all or some resource assignments; for example, a system administrator may specify that only certain reservations such as those for more than a certain quantity of resources or those placed by low-priority customers will be recalculated.

Figure 4:
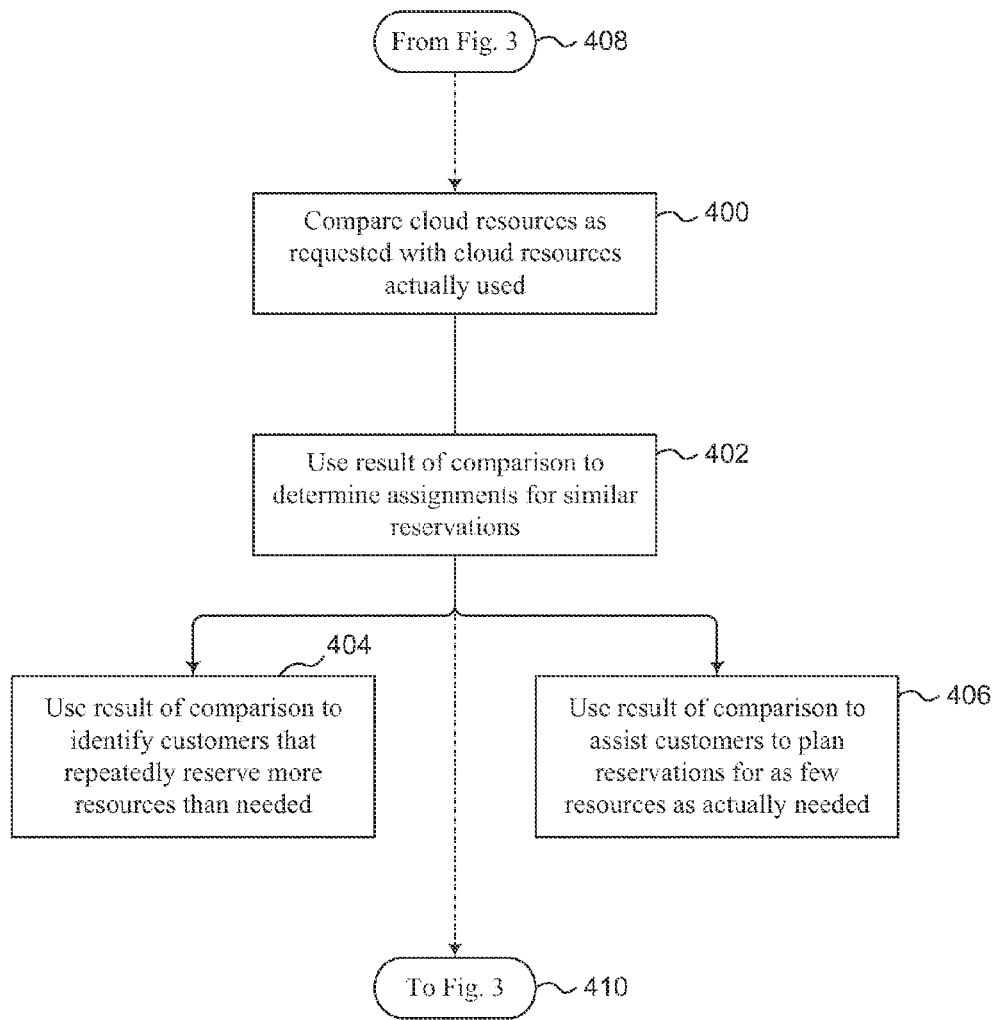
FIG. 4 is a flow chart giving an example of additional features of a method of resource sharing in computer clusters according to objectives.

FIG. 4 gives an example of additional features of a method similar to that shown in FIG. 3 and described above. These additional features include comparing the cloud resources requested in a reservation with the cloud resources actually used in executing the reservation (400) and using the result of the comparison in determining resource assignments for similar reservations (402). Some examples also include using the result of the comparison for one or more of identifying customers that repeatedly request more resources than needed (404) and assisting customers in planning their reservations to request as few resources as actually needed (406). These features may follow from, and lead back to, various points in FIG. 3 as indicated generally by a connection 408 from FIG. 3 and a connection 410 back to FIG. 3. For example, the comparison in 400 may be carried out after the allocation in 310, and then the result of the comparison may be used in the determination 308 in the future.

Figure 5:
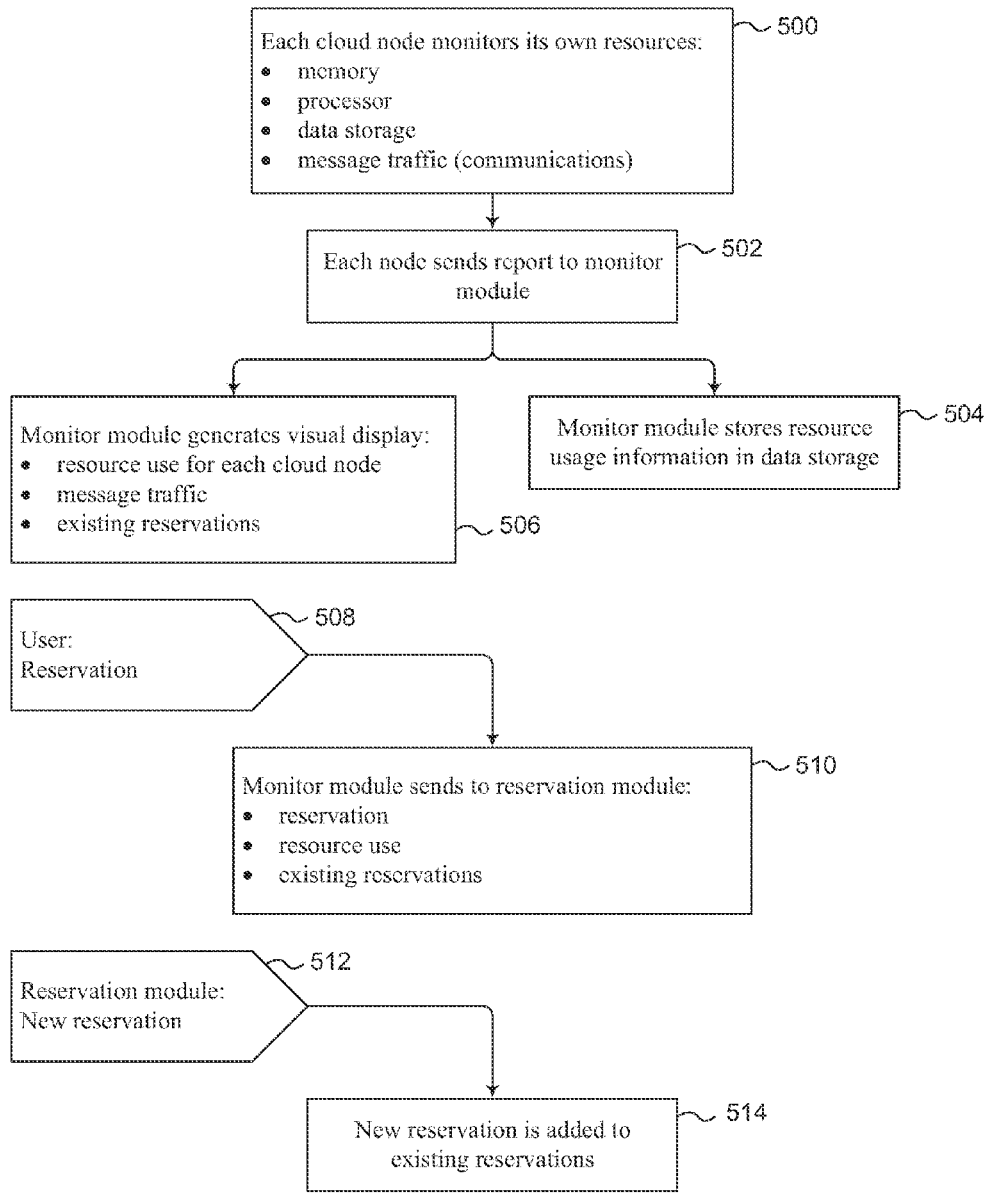
FIG. 5 is a partial flow chart illustrating an example of the functioning of a monitor module in a computer cluster with resource sharing according to objectives.

FIG. 5 gives an example of the functioning of a monitor module such as the monitor module 124. Each cloud node monitors its own resources (500). In some examples this includes one or more of processor usage, amount of memory used, amount of data storage used, amount of message traffic being generated or received, bandwidth consumed in storing or retrieving data, and network bandwidth consumed by message traffic. Each cloud node sends a resource report to the monitor module (502). The monitor module may store resource usage information in the data storage, for example for possible later use in accounting and analysis. If a human user is a customer, the monitor module generates a visual display or some other report format usable by the customer giving such information as resources being used at each cloud node, resources being used throughout the cluster, and any existing reservations (506). If the user sends a reservation (508), the monitor module sends the reservation to the reservation module (510). The monitor module may also send resource use data and existing reservations to the reservation module. When the reservation module receives a new reservation (512) from the monitor module, it adds the new reservation to the list of existing reservations (514).

The visual display or other report shows the actual utilization of all cloud nodes at any given time. A customer may choose which nodes to see and what statistics to monitor. FIG. 6 shows an example of part of a cluster monitoring report in which the customer has selected processor and memory usage as the statistics to be viewed and 3:00 PM on 20 Jul. 2012 as the relevant time. The relevant time may be a time in the past, in which case the customer will obtain a history of what happened at the specified time. Or the relevant time may be the present, in which case the customer will know what is happening now, or the relevant time may be in the future, in which case the customer will learn the status of pending reservations. In this example, statistics for two cloud nodes are presented: cloud node 1 has 80% memory usage and its six processors range from 20% usage (processor no. 2) to 90% (processor no. 4), and cloud node 2 has 30% memory usage and its eight processors range from 25% usage (processor no. 7) to 100% (processor no. 3).

Figure 7:
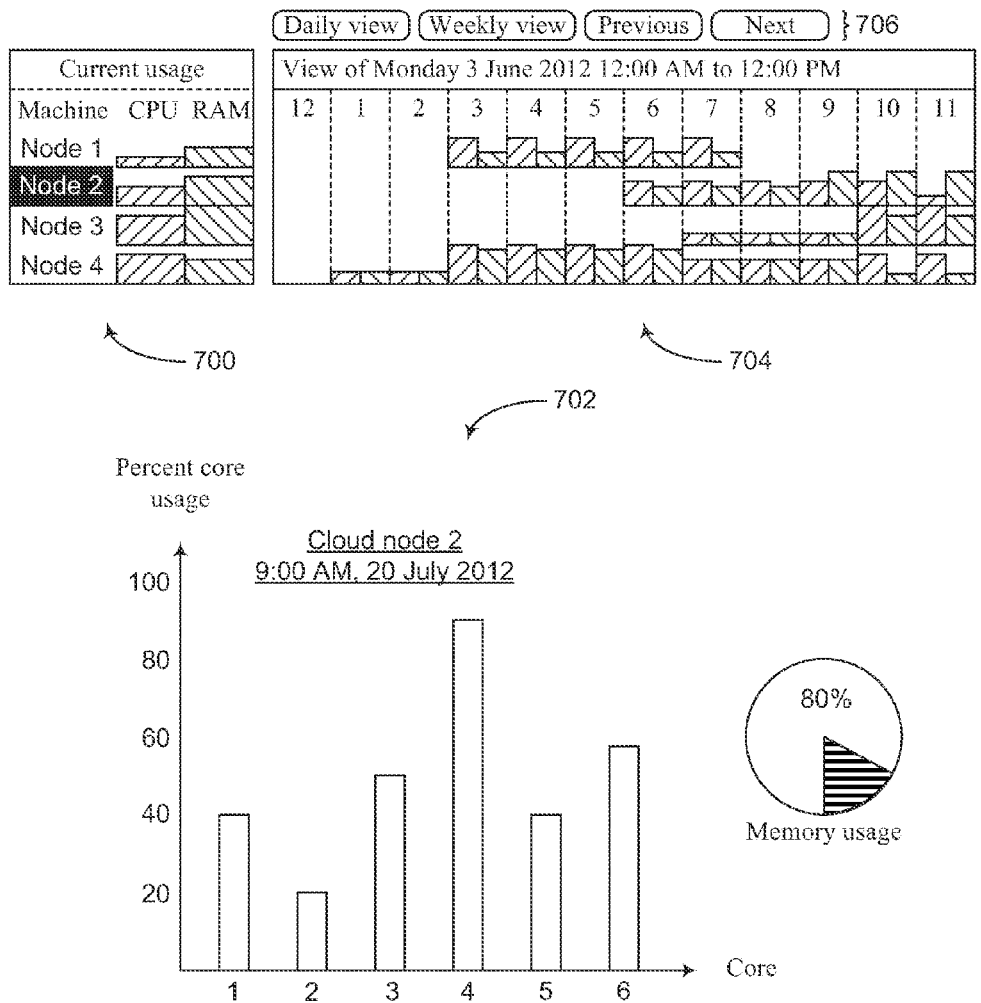
FIG. 7 is a node monitoring report giving an example of information describing utilization of resources in a computer cluster with resource sharing according to objectives.

FIG. 7 depicts an example of a node monitoring report. A current-usage chart 700 shows the instantaneous status of one or more nodes in the cluster. This chart may be updated every second, or every minute, or at any desired interval. In this example the chart shows that Node 1 has about 25% CPU usage and about 50% RAM usage, Node 2 has about 50% CPU usage and about 75% RAM usage, Node 3 has about 75% CPU usage and 100% RAM usage, and Node 4 has about 75% CPU usage and 60% RAM usage. In other examples other node resources may be shown. The customer may select one node for more detailed monitoring, for example by using a mouse to position a cursor over the name of the node. In this example the cursor has been positioned over Node 2, highlighting it, and causing detailed information 702 about Node 2 to be displayed in a format similar to that of FIG. 6. A weekly or daily view 704 may be displayed at the user's option. In this example the user has selected an hourly view, resulting in a display of CPU and RAM usage for each node on an hourly basis is displayed. The user may control what information is displayed in the view 704, for example by control buttons 706.

Figure 8:
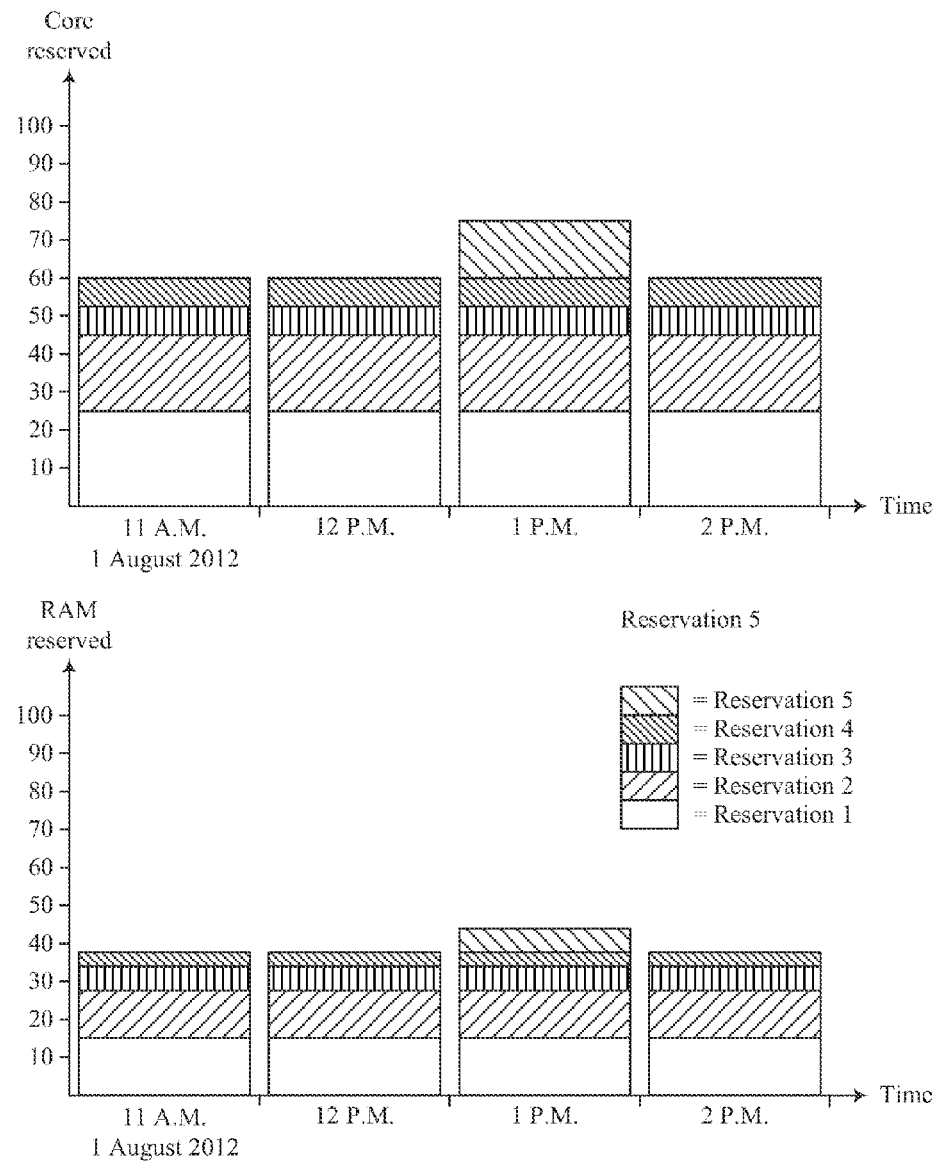
FIG. 8 is a report showing an example of booking information that may be provided to a customer in a computer cluster with resource sharing according to objectives.

As shown in FIG. 8, booking information may be provided to a customer to assist in deciding on a reservation. In the example of FIG. 8, five reservations of CPU and RAM in a given node are displayed over a 4-hour time period. For example, during the interval 11 A.M. to 12 P.M. on 1 Aug. 2012, reservation 1 covers about 25% of CPU and 15% of RAM, reservation 2 about 20% of CPU and 12% of RAM, and so on.

As shown in FIG. 9, reservations can be handled either manually or automatically. Most reservations will usually be handled automatically, and in some examples manual reservations are not permitted because a customer can tie up resources without regard to any objectives that are optimized by automatic resource allocation. In other examples, some or all customers may be permitted to make manual reservations which override any objectives-based allocation of resources.

For a manual reservation, the customer may instruct the computer cluster to generate reports such as those described above to display system utilization information that the customer would need to determine what to reserve. Using a manual booking window 900, the customer selects a time slot, specifies required resources, indicates if the start time or run time is flexible, and enters any other requirements. The reservation module 126 determines whether the reservation can be satisfied. If so, the reservation is stored; if not, the customer is given a report explaining what requirements cannot be satisfied and may be offered an available alternative. An automatic booking window 902 is used if the customer wishes to enter an automatic reservation; in this case the customer need only specify required resources and a time window.

Figure 10A:
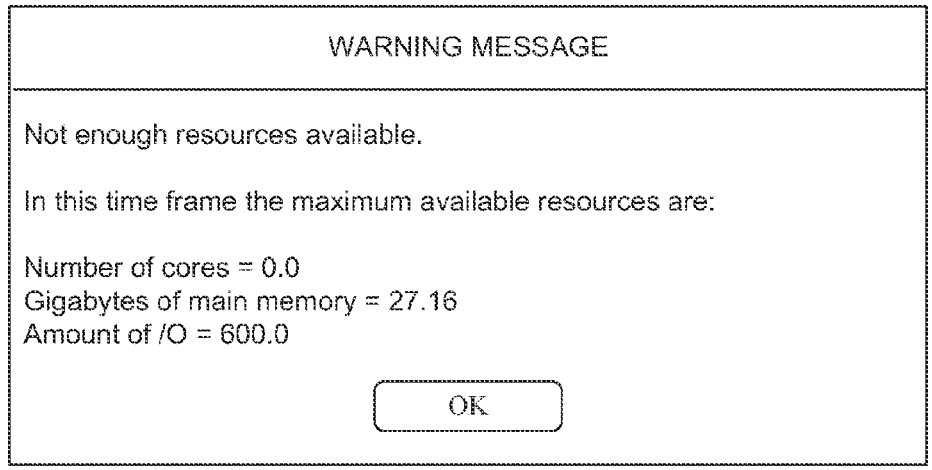
FIGS. 10A and 10B give examples of messages that may be sent to a customer in response to a reservation that cannot be satisfied in a computer cluster with resource sharing according to objectives.
Figure 10B:
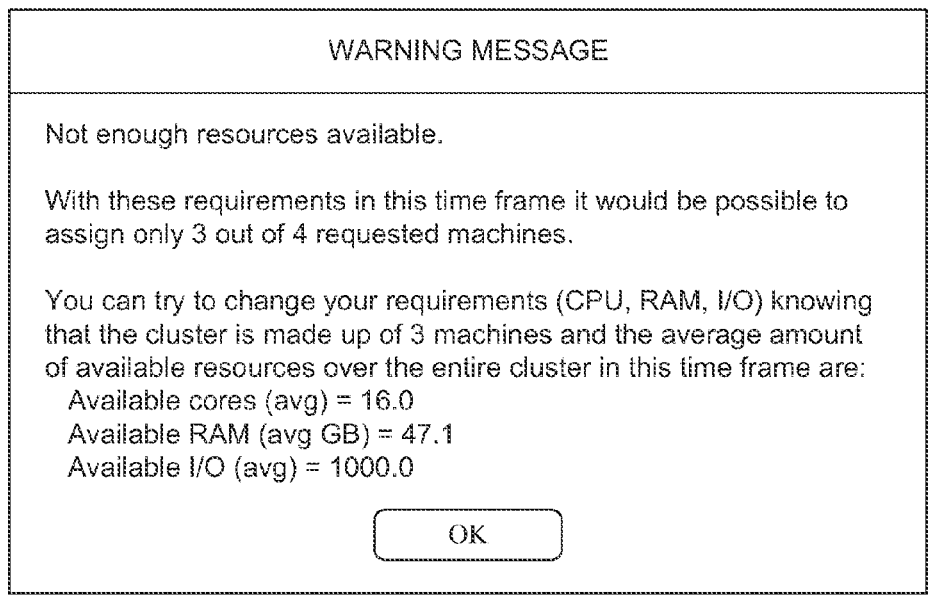

FIGS. 10A and 10B give examples of messages that may be sent to a customer if a reservation cannot be satisfied. FIG. 10A depicts a message in which the customer is told that resources are not available. FIG. 10B depicts a message in which the customer is given more information that may assist the customer in making an alternative reservation.

As discussed above, actual assignments of cloud node resources in response to new and pending reservations are made according to one or more objectives. In some examples this is true of all reservations (automatic reservations are the only ones allowed), in other examples it is true of most reservations (manual ones being rarely used), and in still other examples many of the assignments are made in response to manual reservations and only those that remain can be made according to the objectives.

In some examples the objectives are fixed, and in other examples a system administrator may determine the objectives and may change them by adding, deleting, or modifying them. The reservation module in the allocation node may include instructions to change objectives if circumstances warrant. For example, there may be only one objective—to minimize power usage—unless overall message bandwidth exceeds a certain amount, in which case a second objective—to minimize message bandwidth—may be used in addition to or in place of the first one.

There are various methods of allocating resources according to objectives (as noted above, in a given situation there may be only one objective or there may be several). Broadly these methods may be classified as optimal and rapid. An optimal method finds that allocation which best achieves the objectives. Examples of optimal methods include exhaustive search (the best of all possible combinations of allocations) or other techniques such as linear programming. Optimal methods are often computationally expensive—they use too many computer resources or take too much time—and therefore rapid methods are sometimes used because they can be implemented faster and with fewer computer resources even though they may not achieve the objectives as well as an optimal method would.

The following discussion illustrates application of techniques of allocating resources according to objectives where the objective is to minimize power consumption across a cluster and there are no other objectives. Application of the same techniques to the case where there are one or more other objectives is straightforward.

The terms "node" and "machine" are used interchangeably herein to refer to one physical computer. The terms "processor" and "core" are used interchangeably to refer to one central processor in a machine. A machine may have one or many cores. The terms "memory" and "RAM" are used interchangeably to refer to main memory in one machine. The term "workload" means an application that is actually run in response to a reservation.

In a typical computer cluster, not all the machines are identical, and some machines will likely use less power than others. To minimize the total power used by all the machines, work should be assigned first to those that use the least power. To make assignments with this objective, the amount of power consumed per core in each machine must be determined. Power per core may be expressed as:

$$P_j = \frac{w_j^b + w_j^p}{c_j^t} \quad (1)$$

where:

$P_j$=power consumed by one core in the j-th machine when that core is working, $w_j^b$=base (idling) power consumed by all the cores in the j-th machine, $w_j^p$=peak power (difference between total power and base power) consumed by all the cores in the j-th machine when all cores are working, and $c_j^t$=total number of cores in the j-th machine.

For example, consider a machine having twelve cores. In this machine when all of the cores are idling the base power consumption $w_j^b$ is two kilowatt-hours (KWh) and when all of the cores are working the peak power $w_j^p$ is four KWh. The power consumed per core, when a core is working is then:

$$P_j=(2+4)/12=0.5 \text{ KWh}$$

To meet the objective of minimizing power consumption, cores should be allocated in such a manner that power consumption across the cluster is minimized while ensuring that every workload has all the resources it needs.

As a simple example, consider three machines M1, M2, and M3 and two workloads W1 and W2. M1 has two cores, and M2 and M3 have eight cores each. Power consumption per core is 0.27 KWh for M1, 0.26 for M1 and 0.32 for M3. W1 requires four cores and will start at 3:00 and finish at 5:00. W2 coincidentally also requires four cores and will start at 1:00 and finish at 4:00. A rapid search sorts the nodes according to power consumed per core, which in this case is M2-M1-M3. The workloads are arranged in order of start times, which in this case is W2-W1. It happens that M2 has enough resources to support W2, so M2 is assigned to W2. Next consider W1. It starts before W2 finishes, so no resources will have been released, but M2 has enough resources to support W1 as well as W2, so M2 is assigned to W1. Now assume a third workload W3 needing two cores arrives at 3:30. M2 has no cores available, but M1 has two cores available so is assigned to W3.

Figure 11:
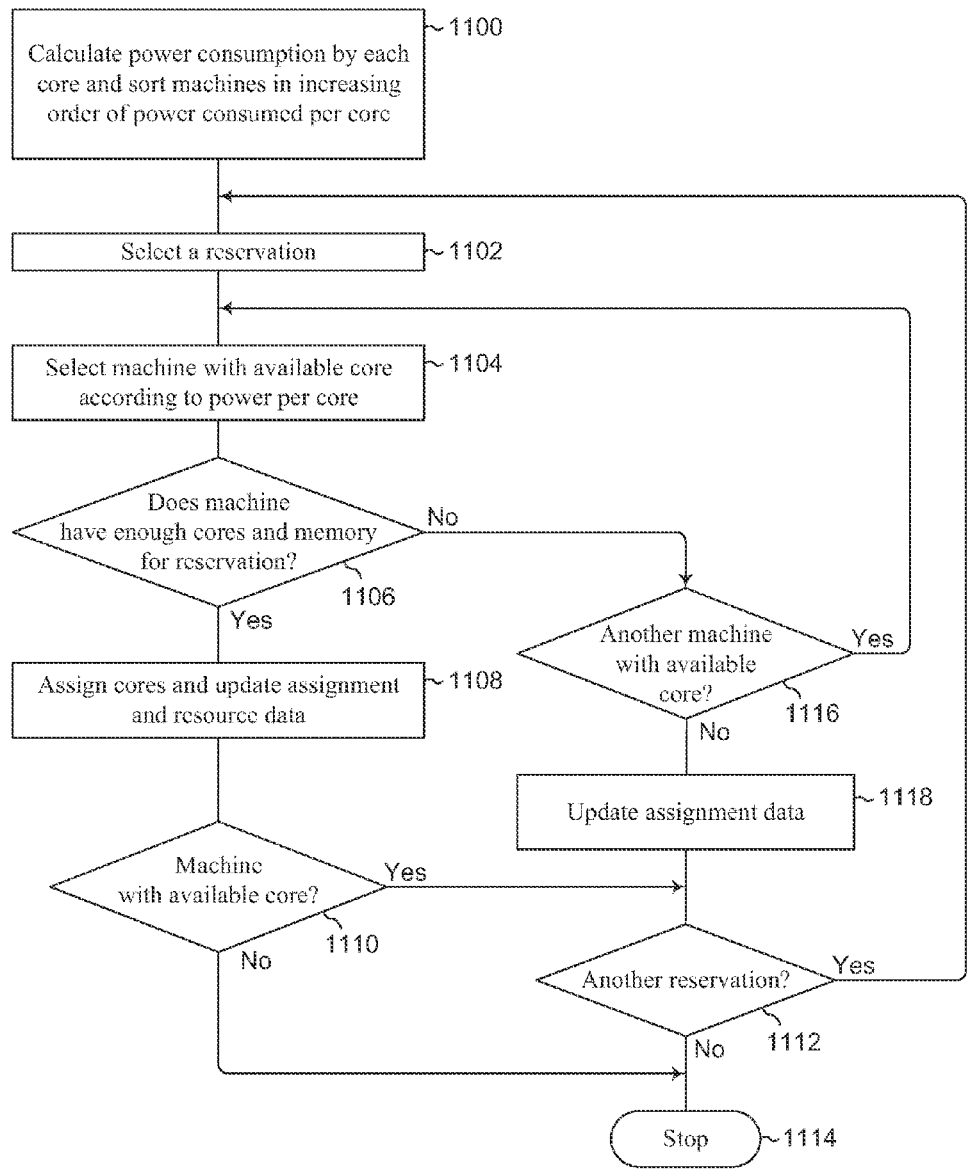
FIG. 11 is a flowchart giving an example of a rapid rigid-resource search that may be used in a computer cluster with resource sharing according to objectives.

FIG. 11 illustrates an example of a rapid rigid-resource search that may be used to determine allocation of resources in a computer cluster in such a way that power consumption is minimized. "Rigid-resource" means that the search may not allocate cores from more than one machine to satisfy a reservation unless the customer has specified that assignment to multiple machines is acceptable. For instance, if a certain reservation specifies ten cores, and if the customer has not specified that cores from more than one machine may be allocated, the search may only assign cores from a machine having at least ten available cores and whatever other resources are required.

In the example of FIG. 11, only cores and memory are considered. The search may easily be modified to consider only core requirements, or to consider one or more other required resources such as data bandwidth and network bandwidth in addition to or instead of memory. In this example it is assumed that all reservations specify the same start time. An example of a search that may be used to determine resource assignments in case of differing start times will be discussed presently.

The rigid-resource search begins by calculating the power consumed by each core, for example according to equation (1), and sorting the machines in increasing order according to power consumed per core (1100). The reservations may be arranged in any order. A reservation is selected (1102), for example randomly. A machine having at least one available core is selected according to power per core (1104). Since the machines are sorted in increasing power consumption per core, this results in the machine with the lowest power consumption per core being selected first.

If the selected machine has enough available cores and memory to satisfy the reservation (1106), the cores are assigned and assignment and resource data are updated accordingly (1108) to reflect how many cores and how much memory in that machine are still available. If the reservation is a composite reservation, the selected machine must have enough available cores and memory for all of the sub-tasks in order for the assignment to be effected. Information respecting assignments and available resources may be stored in data storage 104 (FIG. 1) or in some other manner as desired. Then if there is a machine with any cores available for assignment (1110) and if there is another reservation (1112), the search iterates, going back to selecting a reservation (1102), and otherwise the search ends (1114).

If the selected machine does not have enough of both cores and memory available to satisfy the reservation (1106), and if there is another machine with any cores available (1116), the search iterates, going back to selecting a machine with at least one available core according to power per core (1104). In other words, each time the search iterates in trying to satisfy a given reservation, it considers the machine with next-lowest power consumption per core after the machine that was just considered and found not to have enough resources. If there are no more machines with cores available (1116), assignment data are updated (1118), for example to reflect that the reservation could not be assigned, and if there is another reservation (1112) the search iterates, going back to selecting a reservation (1102) and selecting a machine with at least one core available (1104) and having the lowest power consumption per core of any of the machines that have cores available. Otherwise the search ends (1114).

Appendix One gives an example of pseudocode that can be used to implement a rigid-resource search.

Figure 12A:
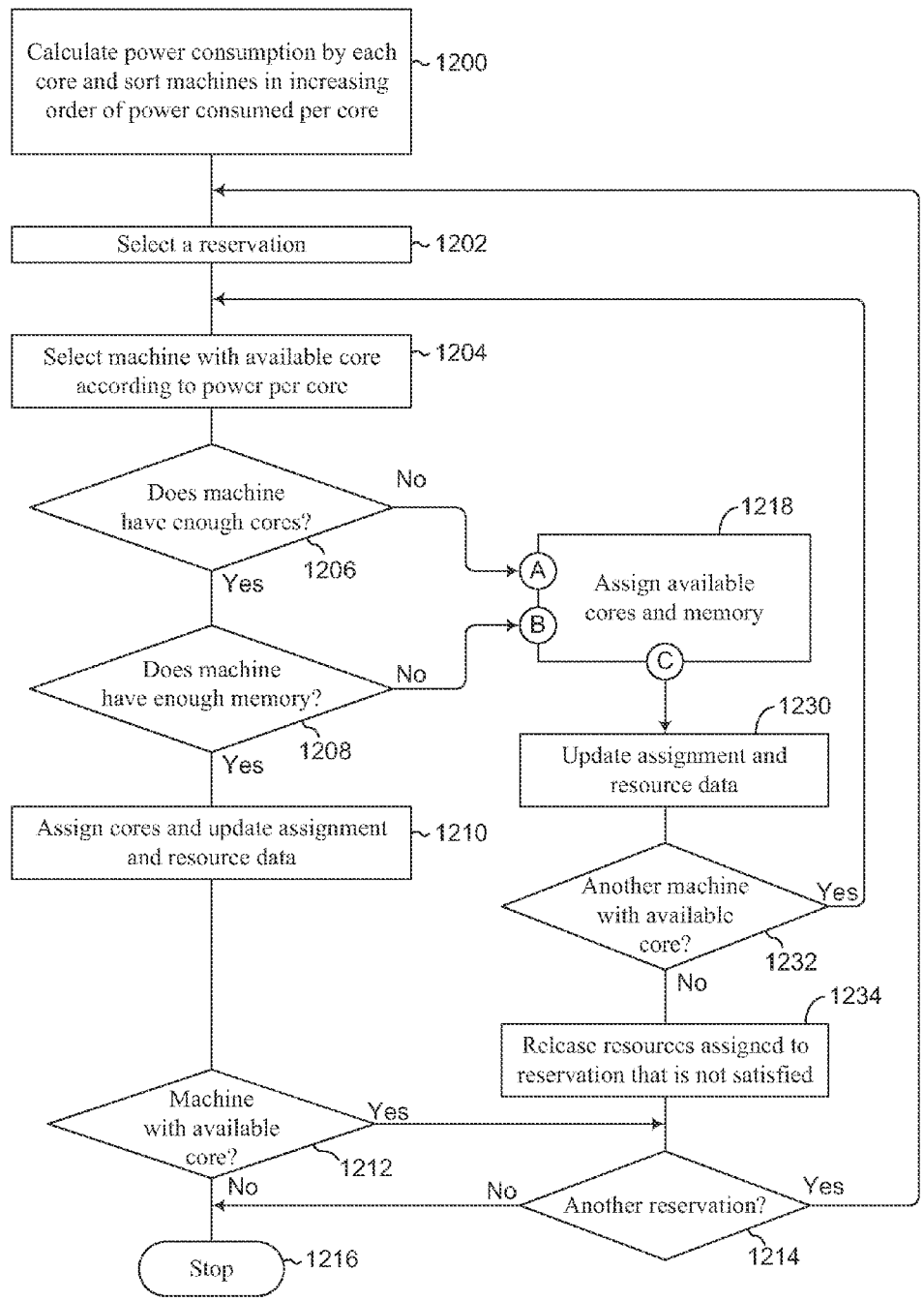
FIGS. 12A and 12B are a flowchart giving an example of a rapid flexible-resource search that may be used in a computer cluster with resource sharing according to objectives.
Figure 12B:
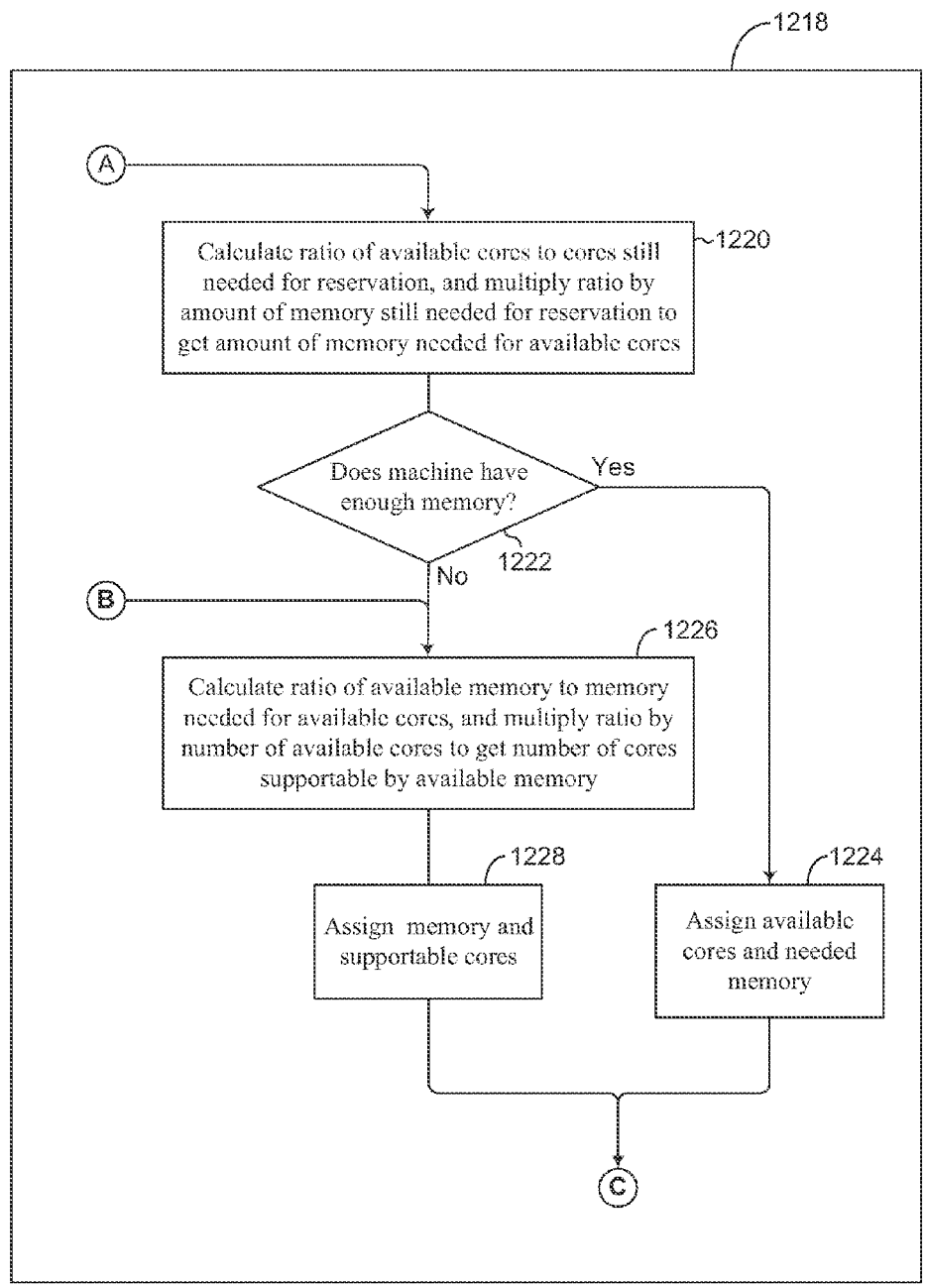

FIGS. 12A and 12B illustrate an example of a rapid flexible-resource search that may be used to determine assignments of resources in a computer cluster in such a way that power consumption is minimized. "Flexible-resource" means that the search may assign cores from more than one machine to a given reservation. For instance, if a certain reservation specifies ten cores, the search may assign cores from a first machine having six cores available and from a second machine having four cores available.

In this example both cores and memory specified by each reservation are considered, and cores from more than one machine are assigned, then memory is assigned proportionally to cores. For example, if ten cores and 50 gigabytes of memory are required, and if the search assigns six cores from a first machine having at least six cores available and four cores from a second machine having at least four cores available, then 30 gigabytes of memory (6/10 of the 50 gigabytes of required memory) out of the total memory in the first machine will be assigned, and 20 gigabytes of memory (4/10 of the 50 gigabytes) out of the total memory in the second machine will be assigned.

In other examples, the reservation may specify the resources in sufficient detail that apportionment is not required. For example, the customer might say in a reservation that ten cores each with five gigabytes of memory are required. Another reservation might specify a combination of six cores with 20 gigabytes of RAM each and four cores with eight gigabytes each. In such cases, the search does not perform the steps of proportionally adjusting resources. If the customer requires more cores or more memory than a given machine has available, then as many of the customer's needs as possible are satisfied from that machine and then the next machine is considered.

If the first machine has insufficient memory available, then only as many cores in the first machine as can be supported by the amount of memory available are assigned. In the foregoing example, ten cores and 50 gigabytes of memory are required. This indicates an average memory requirement of 5 gigabytes per core. If the first machine has six cores but only 25 gigabytes of memory available (other memory in the first machine may already have been assigned in response to another reservation to which other cores in that machine have already been assigned), then only five cores—each of which requires an average of 5 gigabytes in this workload—together with 25 gigabytes of memory would be assigned.

If the reservation in the foregoing example had specified 10 cores but only 20 gigabytes of memory, then the search could have assigned all six available cores in the first machine because only 20*(6/10)=12 gigabytes of memory would have been required by the six cores.

The flexible-resource search may easily be modified to account only for core requirements, or to account for other required resources such as data bandwidth and network bandwidth in addition to or instead of memory. As in the preceding example, it is assumed that the same start time applies to all reservations.

The flexible-resource search begins by calculating the power consumed by each core, for example according to equation (1), and sorting the machines in increasing order according to power consumed per core (1200). The reservations may be arranged in any order. A reservation is selected (1202), for example randomly. A machine having at least one available core is selected according to power per core (1204). Since the machines are sorted in increasing power consumption per core, this results in the machine with the lowest power consumption per core being selected first.

If the selected machine has enough available cores (1206) and memory (1208) to satisfy the reservation (1206), the cores are assigned, and assignment and resource data are updated accordingly (1210) to reflect how many cores and how much memory in that machine are still available. Information respecting assignments and available resources may be stored in data storage 104 (FIG. 1) or in some other manner as desired. Then if there is a machine with any cores available for assignment (1212) and if there is another reservation (1214), the search iterates, going back to selecting a reservation (1202), and otherwise the search ends (1216).

If the selected machine does not have enough of both cores and memory available (1206 and 1208), available cores and memory of the selected machine are assigned (1218). Assignment and resource data are updated (1230). If there are more machines with available cores (1232), the search iterates, going back to selecting a machine having at least one available core according to power per core (1204), again taking machines in increasing order of power consumption per core. Otherwise, if there is another reservation (1214) the search iterates, going back to selecting a reservation, and if not the search ends (1216).

As noted above, in some examples assigning available cores and memory of the selected machine (1218) includes, if the selected machine does not have enough cores to satisfy the reservation (1206), calculating a ratio of available cores to cores needed and multiplying the ratio by the amount of memory needed to determine the amount of memory needed for the available cores (1220). In other examples the user specifies resources in sufficient detail, such as memory per core, that this type of calculation is not needed and therefore is not performed.

To return to the previous example of a reservation specifying ten cores and 50 gigabytes of memory, assume the selected machine has six cores and 20 gigabytes of memory not yet assigned. The ratio would be 6/10, and multiplying this ratio by the 50 gigabytes of memory specified by the reservation results in 50*(6/10)=30 gigabytes of memory needed for the six available cores.

If the selected machine has enough memory for the available cores (1222), the needed memory and the available cores are assigned (1224). Otherwise, a ratio of available memory to the amount of memory needed by the available cores is calculated and multiplied by the number of available cores to determine the number of cores that can be supported by the available memory (1226). The available memory in the selected machine and the number of cores in the selected machine that can be supported by that memory are assigned (1228).

Returning again to the previous example, 30 gigabytes of memory are needed for the six available cores, but only 20 gigabytes are available. The number of cores that can be assigned will therefore have to be scaled according to the amount of memory available. The ratio of available memory to amount of memory needed by available cores computes as 20/30. Multiplying this ratio by the number of cores available yields 6*(20/30)=4. Hence, four is the maximum number of cores that can be supported by the available 20 gigabytes of memory, and accordingly four cores and 20 gigabytes of memory in the selected machine are assigned.

Meanwhile, if the selected machine has enough cores (1206) but not enough memory (1208), a ratio of available memory to the amount of memory needed by the cores of the selected machine is calculated and multiplied by the number of cores of the selected machine to determine the number of cores that can be supported by the available memory (1226). The available memory and the number of cores that can be supported by that memory are assigned (1228).

Assignment and resource data are updated (1230). If there is another machine with at least one available core (1232) the search iterates to selecting a machine with at least one available core (1204).

If there are no more machines with available cores (1232) it will be apparent that the reservation cannot be satisfied, because if it reaches this point the search will have checked all the machines and will not have found any with enough cores and memory to satisfy the reservation. Therefore, any resources that were assigned to that reservation are released (1234). There might still be other pending reservations with smaller requirements, so if there is another reservation (1214) the search iterates to selecting a reservation (1202). Otherwise the search ends (1216).

Appendix Two gives an example of pseudocode that can be used to implement a flexible-resource search for a system in which the user specifies resources in enough detail that no apportionment of ratios of resources such as cores and memory is required.

Figure 13A:
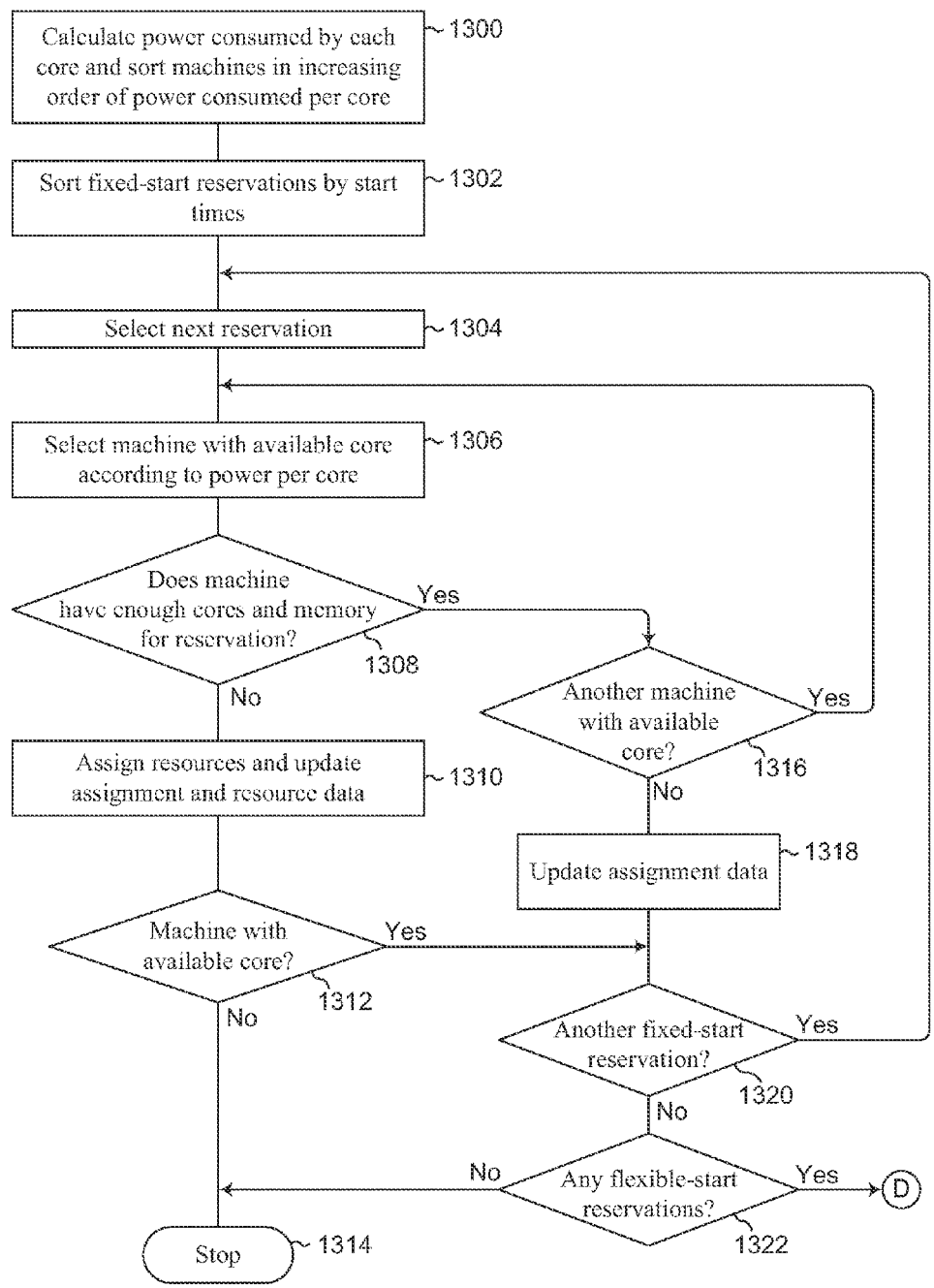
FIGS. 13A and 13B are a flowchart giving an example of a rapid flexible-time search that may be used in a computer cluster with resource sharing according to objectives.
Figure 13B:
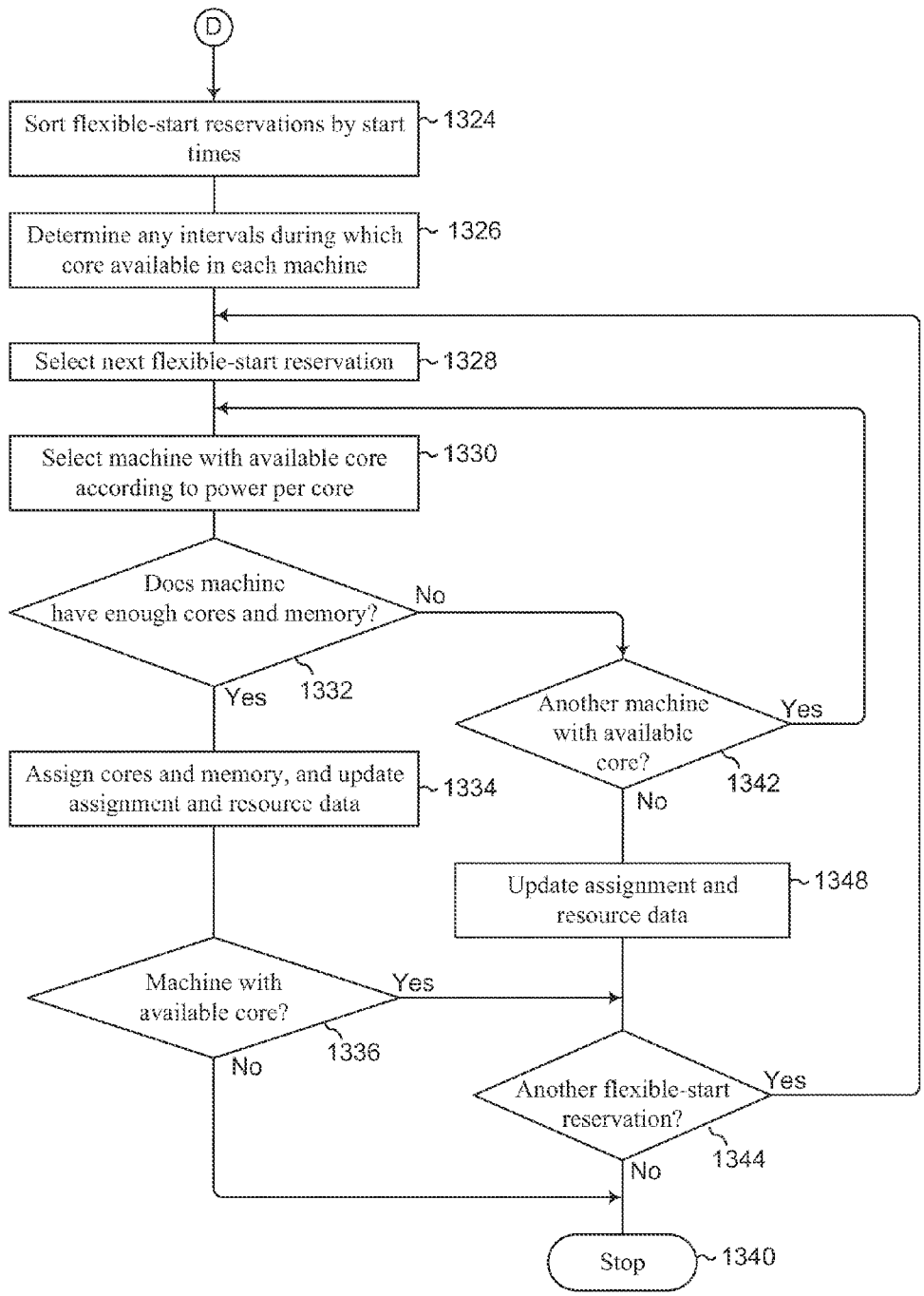

FIGS. 13A and 13B illustrate an example of a rapid flexible-start rigid-resource search. In this example, reservations may specify various different start times. In addition, in some examples there may be flexible start times—that is, in the reservation the customer may specify a range of acceptable start times rather than a fixed start time. The search is a rigid-resource search, which means that no reservation can be assigned to more than one machine (unless the reservation expressly allows such assignment), but extension of this search to a flexible-resource environment is straightforward.

The flexible-start rigid-resource search begins with calculating power consumption by each core and sorting machines in increasing order of power consumed per core (1300). Fixed-start-time reservations are sorted in order of start times (1302). A next reservation is selected (1304). A machine with at least one available core is selected according to power per core (1306). If the selected machine has enough resources (both cores and memory) to satisfy the reservation (1308), the resources are assigned and assignment and resource data are updated (1310). If there are no more machines with any available cores (1312), the search ends (1314).

If the selected machine does not have enough resources (1308) and if there is another machine with at least one available core (1316), the search iterates to selecting a machine with at least one available core according to power consumption per core (1306). Each time the search iterates it considers the machine with the next-lowest power consumption per core after the machine just considered and found not to have enough resources. If there are no more machines, assignment data are updated (1318), for example to indicate that it was not possible to assign the workload.

If there are any more fixed-start reservations (1320) the search iterates to selecting a next reservation (1304). If there are no more fixed-start reservations, the search ends (1314) unless it also allows flexible-start reservations, and in that case if there are no flexible-start reservations (1322), the search ends.

In some examples, flexible-start reservations are also allowed. If there are flexible-start reservations (1322), they are sorted by start times (1324). Any intervals during which at least one core is available in each machine are determined (1326). A next flexible-start reservation is selected (1328), and a machine with at least one available core is selected (1330), starting with the machine having the lowest power consumption per core.

If the selected machine has enough of both cores and memory to satisfy the selected reservation during any interval of time that encompasses the flexible start time and duration of that reservation (1332), cores and memory of that machine are assigned, and assignment and resource data are updated (1334), and if there is another machine with at least one available core (1336) and if there is another flexible-start reservation (1338), the search iterates to selecting a next reservation, otherwise the search ends (1340).

If the selected machine does not have enough of both cores and memory to satisfy the reservation during any interval of time that encompasses the flexible start time and duration of that reservation (1332), and if there is another machine with at least one available core (1342), the search iterates to selecting a next machine with at least one available core, otherwise assignment data are updated (1344), and if there is another flexible-start reservation the search iterates to selecting a next reservation, otherwise the search ends (1340).

Appendix Three gives an example of pseudocode that can be used to implement a flexible-start rigid-resource search in which the customer may specify a start time but not a range of start times. Extension of the pseudocode to include reservations having ranges of start times is straightforward.

In another example, determining resource assignments according to objectives may be formulated as an objective function to be minimized, for example by linear programming. If the objective is to minimize total power consumption across the cluster, the function to be minimized becomes a description of the total power (both base power and peak power) used by all the machines in the cluster. For example, a certain machine with 12 cores might have a base (resting) power consumption of 0.3 kilowatt-hours (KWh) and a working power consumption (in addition to the base power consumption) by any processor of 0.2 KWh during the time that processor is being used. If one processor is being used, the total power consumed by that machine would be 0.5 KWh (0.3 KWh resting power plus 0.2 KWh for the one processor that is running), and if all 12 processors are in use, the total power consumed would be 2.7 KWh (0.3 KWh resting plus 0.2 KWh×12 processors running).

In determining resource assignments, all the resource requirements (number of cores, amount of memory, etc.) of each workload are to be satisfied, and the solution is to be feasible and semantically correct (for example, no machine is assigned more workloads than it can accommodate, each workload is serviced exactly once, and the like).

The following notation will be used in this discussion:
$w_i$ means the i-th workload,
$m_j$ means the j-th machine,
$m_j^{w_i}$ means the j-th machine allocated for the i-th workload,
W means the total number of workloads,
$W_j$ means the number of workloads assigned to the j-th machine,
$R_j$ means total resources of the j-th machine,
$R_j^a$ means available resources of the j-th machine,
$R_j^{w_i}$ means resources of the j-th machine being used by the i-th workload,
$L_i$ means the resources needed by the i-th workload,
$b_i$ is a performance constraint of the i-th workload,
$c_i$ is the number of cores needed by the i-th workload,
$r_i$ is the amount of memory needed by the i-th workload,
$d_i$ is the disk bandwidth needed by the i-th workload,
$n_i$ is the network bandwidth needed by the i-th workload,
$c_j^a$ is the number of cores available in the j-th machine,
$r_j^a$ is the amount of main memory available in the j-th machine,
$d_j^a$ is the disk bandwidth (in megabytes/second) available in the j-th machine,
$n_j^a$ is the network bandwidth (in megabytes/sec) available to the j-th machine,
$c_j^t$ is the total number of cores in the j-th machine,
$r_j^t$ is the total amount of main memory in the j-th machine,
$d_j^t$ is the total disk bandwidth (in megabytes/second) in the j-th machine,
$n_j^t$ is the total network bandwidth (in megabytes/second) of the j-th machine,
$w_{ij}$ is the power consumed by the i-th workload $w_i$ in the j-th machine,
$w_j^b$ is the base power consumed by the j-th machine,
$w_j^p$ is the peak power consumed by all the cores in the j-th machine,
$u_j^w$ is the number of workloads running on all the cores in the j-th machine,
$\Omega$ is the total power consumed by the computer cluster,
$e_i$ is the end time of i-th workload,
$s_i$ is the start time of the i-th workload, and
$k_j$ is the total duration of all the workloads executed in the j-th machine.

The resources needed by $w_i$ may be expressed as $$L_i = \{c_i, r_i, d_i, n_i\}$$

the resources available in $m_j$ as $$R_j^a = \{c_j^a, r_j^a, d_j^a, n_j^a\},$$

and $m_j$ can accommodate $w_i$ only if $$\begin{cases} c_i \le c_j^a \\ r_i \le r_j^a \\ d_i \le d_j^a \\ n_i \le n_j^a \end{cases}$$

which can be expressed more compactly as $$R_j^a < L_i$$

Similarly, a group of machines $m_1$ to $m_k$ can accommodate $w_i$ if $$R_1^a \cup R_2^a \cup \ldots \cup R_k^a < L_i$$

disregarding any overhead associated with running a workload on more than one machine.

Assuming, as in the foregoing examples, that the objective to be satisfied is to minimize electrical power consumed by all the machines in the computer cluster. The amount of power attributable to the i-th workload being executed on the j-th machine $m_j$ is given by $$w_{ij} = \frac{w_j^b}{u_j^w} + \frac{c_{ij}}{c_j^t} \cdot w_j^p$$

where the first term represents a division of the base power equally among the workloads and the second term represents the ratio of number of cores used by the i-th workload to total number of cores multiplied by the total peak power.

The total power used in the j-th machine $m_j$ is given by $$\sum_{i=1}^{s} \left( \frac{w_j^b}{u_j^w} + \frac{c_{ij}}{c_j^t} \cdot w_j^p \right)$$

The total number of workloads is equal to $u_j^w$ and therefore the first term sums to the total base power $w_j^b$. The second term sums to the total peak power $w_j^p$ if all cores are in use, or a fraction of the total peak power if some of them are not in use. This in turn may be summed over all the machines in the computer cluster to get the total power $\Omega$ used by the cluster as $$\Omega = \sum_{j=1}^{q} \sum_{i=1}^{s} \left( \frac{w_j^b}{u_j^w} + \frac{c_{ij}}{c_j^t} \cdot w_j^p \right) \quad (2)$$

As discussed above, a rigid-resource assignment means that each workload may only be run on a single machine (unless the customer has specified otherwise). A flexible-resource assignment means workloads may be split among machines. A flexible-time assignment means start times, and in some examples ranges of start times, may be specified by customers. A dynamic assignment, which can also be rigid-resource or flexible-resource, means workloads can arrive randomly without advance reservations.

In light of the foregoing, the objective function comprises a sum over a first term related to the base power consumed by each node and a second term related to the peak power consumed by each node in running the various workloads:

$$\Omega = \sum_{j=1}^{q} \sum_{i=1}^{s} \left( \frac{w_j^b}{u_j^w} \cdot v_j + \frac{c_i \cdot w_j^p}{c_j^t} \cdot (e_i - s_i) \cdot x_{ij} \right) \quad (3)$$

where:
q=number of machines in the computer cluster,
s=number of workloads in all reservation,
$v_j$=duration of time during which any cores in the j-th machine are running, and $x_{ij}=1$ if the i-th workload is assigned to the j-th node and 0 otherwise.

A minimum for equation (3) may be found by calculating every possible solution and then choosing the best. This is sometimes known as the "brute force" approach. The brute force approach gives the best possible answer but at the cost of lengthy calculations. Linear programming may be used to find a minimum for equation (3) and, when solved, gives an optimal solution. The rapid searches described above give approximate solutions. However, rapid searches are much less costly than linear programming, which in turn is less costly than using brute force, in that rapid searches can be completed very rapidly and with minimal use of computer resources, whereas obtaining an optimal solution may be computationally expensive.

Solutions of the objective function by linear programming, and corresponding rapid searches, were tested in a variety of scenarios. Rapid searches resulted in allocations that reduced power consumption almost as much as solving the objective function (in some instances the difference was less than ten percent) but at significantly less computation cost. For a 30-node example, solving the objective function required from one second (10 reservations) to 60 seconds (40 reservations). For 15 workloads, solving the objective function required from 10 seconds (50 nodes) to 30 seconds (100 nodes). In all these cases, the rapid searches required less than 0.1 seconds.

A computer cluster with resource sharing according to objectives as described above provides effective sharing of resources among many users according to one or more objectives. The administrator can change objectives and assignment techniques as desired by changing or replacing the module in which the assignments are made. Initial assignments of resources can be adjusted as new reservations arrive. Resources can be assigned and reassigned to flexible reservations as conditions change. A history of resource usage may be used for accounting purposes and for predicting future resource usage.

APPENDIX ONE

Rapid Rigid-Assignment Search

```
input: wList, mList
output: assignment
consumptionList ← [ ];
assignment ← [ ];
for j ← 1 to len(mList) do
```

$$a \leftarrow \frac{w_j^b + w_j^p}{c_j^t};$$

```
    consumptionList.append(a);
end
/* sort (asc) mList according to consumptionList */
sort ( consumptionList, mList );
for i ← 1 to len(wList) do
    foundMachine? ← false;
    for j ← 1 to len(mList) do
        if c_j^a ≥ c_i and d_j^a ≥ d_i then
            foundMachine ← true;
            assignment.append ([w_i, m_j]);
            c_j^a ← c_j^a - c_i;
            d_j^a ← d_j^a - d_i;
            wList.remove (w_i);
            /* exit the inner cycle and pass to the following workload */
            break;
        end
    end
    if foundMachine? ← false then
        print 'Not enough resources to create an assignment';
        return 0
    end
```

APPENDIX ONE-continued

Rapid Rigid-Assignment Search

```
end
print 'Assignment correctly created';
return assignment;
```

APPENDIX TWO

Rapid Flexible-Resource Search

```
input: wList, mList
output: assignment
consumptionList ← [ ];
assignment ← [ ];
for j ← 1 to len(mList) do
```

$$a \leftarrow \frac{w_j^b + w_j^p}{c_j^t};$$

```
    consumptionList.append(a);
end
/* sort (asc) mList according to consumptionList */
sort ( consumptionList, mList );
for i ← 1 to len(wList) do
    assigned? ← false;
    for j ← 1 to len(mList) do
        if c_j^a ≥ c_i and d_j^a ≥ d_i then
            assigned ← true;
            assignment.append ([w_i, m_j]);
            c_j^a ← c_j^a - c_i;
            d_j^a ← d_j^a - d_i;
            wList.remove (w_i);
            break;
        end
        if c_j^a ≥ c_i and d_j^a < d_i then
            assignment.append ([w_i, m_j]);
```

$$c_j^a \leftarrow c_j^a - \left(c_i \cdot \frac{d_j^a}{d_i}\right);$$

$$d_j^a \leftarrow 0;$$

$$c_i = c_i - \left(c_i \cdot \frac{d_j^a}{d_i}\right);$$

$$d_i = d_i - d_j^a;$$

continue;

```
        end
        if c_j^a < c_i and d_j^a ≥ d_i then
            assignment.append ([w_i, m_j]);
```

$$c_j^a \leftarrow 0;$$

$$d_j^a \leftarrow d_j^a - \left(d_i \cdot \frac{c_j^a}{c_i}\right);$$

$$c_i = c_i - c_j^a;$$

$$d_i = d_i - \left(d_i \cdot \frac{c_j^a}{c_i}\right);$$

continue;

```
        end
        if c_j^a < c_i and d_j^a < d_i then
            /* assign all min (c_i, d_i) and as much as possible of max (c_i, d_i) */
        end
    end
    if assigned? = false then
        print 'Not enough resources to create an assignment';
        return 0
    end
end
print 'Assignment correctly created';
return assignment;
```

APPENDIX THREE

Rapid Flexible-Time Search

```
input: wList, mList
output: assignment
consumptionList ← [ ];
assignment ← [ ];
for j ← 1 to len(mList) do
```

$$a \leftarrow \frac{w_j^b + w_j^p}{c_j^t};$$

```
   consumptionList.append(a);
end
/* sort (asc) mList according to consumptionList */
sort ( consumptionList, mList );
for j ← 1 to len(wList) do
   /* take out the start time */
   b ← wList [1];
   startTimeList.append (b);
end
sort .(startTimeList, wList);
for i ← 1 to len(wList) do
   for k ← 1 to i - 1 do
      /* check the workload's status */
      if w_k [3] = 'executed' then
         m_h ← node executing w_k;
         c_h^a ← c_h^a + c_k;
         d_h^a ← d_h^a + d_k;
         w_k [3] ← 'released';
      end
   end
   foundMachine? ← false;
   for j ← 1 to len(mList) do
      if c_j^a ≥ c_i and d_j^a ≥ d_i then
         foundMachine? ← true;
         assignment.append ([w_i, n_j]);
         c_j^a ← c_j^a - c_i;
         d_j^a ← d_j^a - d_i;
         w_i [3] ← 'executed';
         /* exit the inner cycle and pass to the following workload */
         break;
      end
   end
   if foundMachine? = false then
      print 'Not enough resources to create an assignment';
      return 0
   end
end
print 'Assignment correctly created';
return assignment;
```

What is claimed is:

1. A method of assigning resources of a computer cluster with resource sharing according to objectives, the method comprising:
monitoring resources of each of a plurality of cloud nodes;
providing information descriptive of the cloud node resources;
receiving a reservation;
determining whether resources are available to satisfy the reservation and any other pending reservations;
if resources are available, using a rapid search to determine resource assignments for the reservation and any other pending reservations according to one or more objectives; and
allocating resources according to the resource assignments.

2. The method of claim 1 wherein the one or more objectives comprise minimizing power consumption throughout the computer cluster.

3. The method of claim 2 wherein the rapid search comprises a rigid-resource search that assigns cloud nodes for reservations in increasing order of power consumed per core.

4. The method of claim 2 wherein the rapid search comprises a flexible-resource search that assigns cloud nodes for reservations in increasing order of power consumed per core.

5. The method of claim 4 wherein the flexible-resource search comprises, for a reservation to which resources from more than one cloud node are assigned, apportioning the resources from each cloud node in relative quantities determined by relative quantities of resources specified in the reservation.

6. The method of claim 2 wherein the rapid search comprises a flexible-start search that assigns cloud nodes for reservations in increasing order of power consumed per core.

7. The method of claim 6 wherein the flexible-start search comprises assigning cloud nodes for reservations in order of start times.

8. The method of claim 6 wherein the flexible-start search comprises assigning cloud nodes for reservations having fixed start times and then assigning cloud nodes for reservations having flexible start times according to intervals of time during which the cloud nodes have sufficient resources to accommodate the flexible-start reservations.

9. The method of claim 1 wherein determining whether resources are available comprises making the determination for all sub-tasks of a composite reservation.

10. A computer cluster with resource sharing according to objectives, the cluster comprising a plurality of cloud nodes each including one or more resources; a terminal; data storage; and an allocation node to:
monitor the cloud node resources;
provide information descriptive of the cloud node resources to a customer through the terminal;
receive a reservation for cloud node resources from the customer;
store the reservation in the data storage;
determine assignments of the cloud node resources for the reservation and any other pending reservations according to one or more objectives by rapid search; and
allocate the cloud node resources to customers according to the resource assignments.

11. The computer cluster of claim 10 wherein the one or more objectives comprise minimizing power consumption throughout the computer cluster.

12. The computer cluster of claim 11 wherein the rapid search comprises a rigid-resource search to assign cloud nodes in increasing order of power consumed per core.

13. The computer cluster of claim 11 wherein the rapid search comprises a flexible-resource search to assign cloud nodes in increasing order of power consumed per core.

14. The computer cluster of claim 11 wherein the rapid search comprises a flexible-start search to assign cloud nodes in increasing order of power consumed per core.

* * * * *